UNITED STATES PATENT OFFICE.

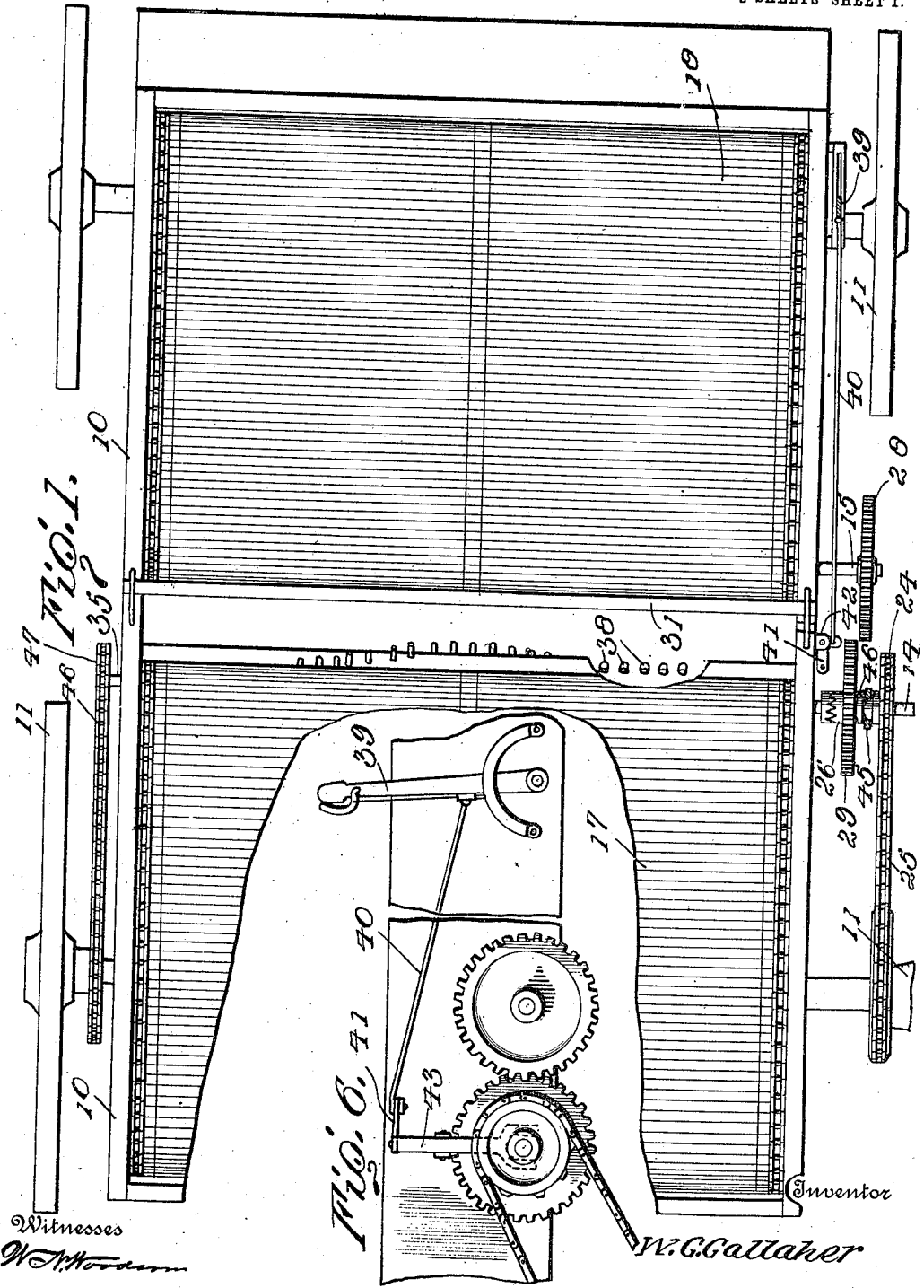

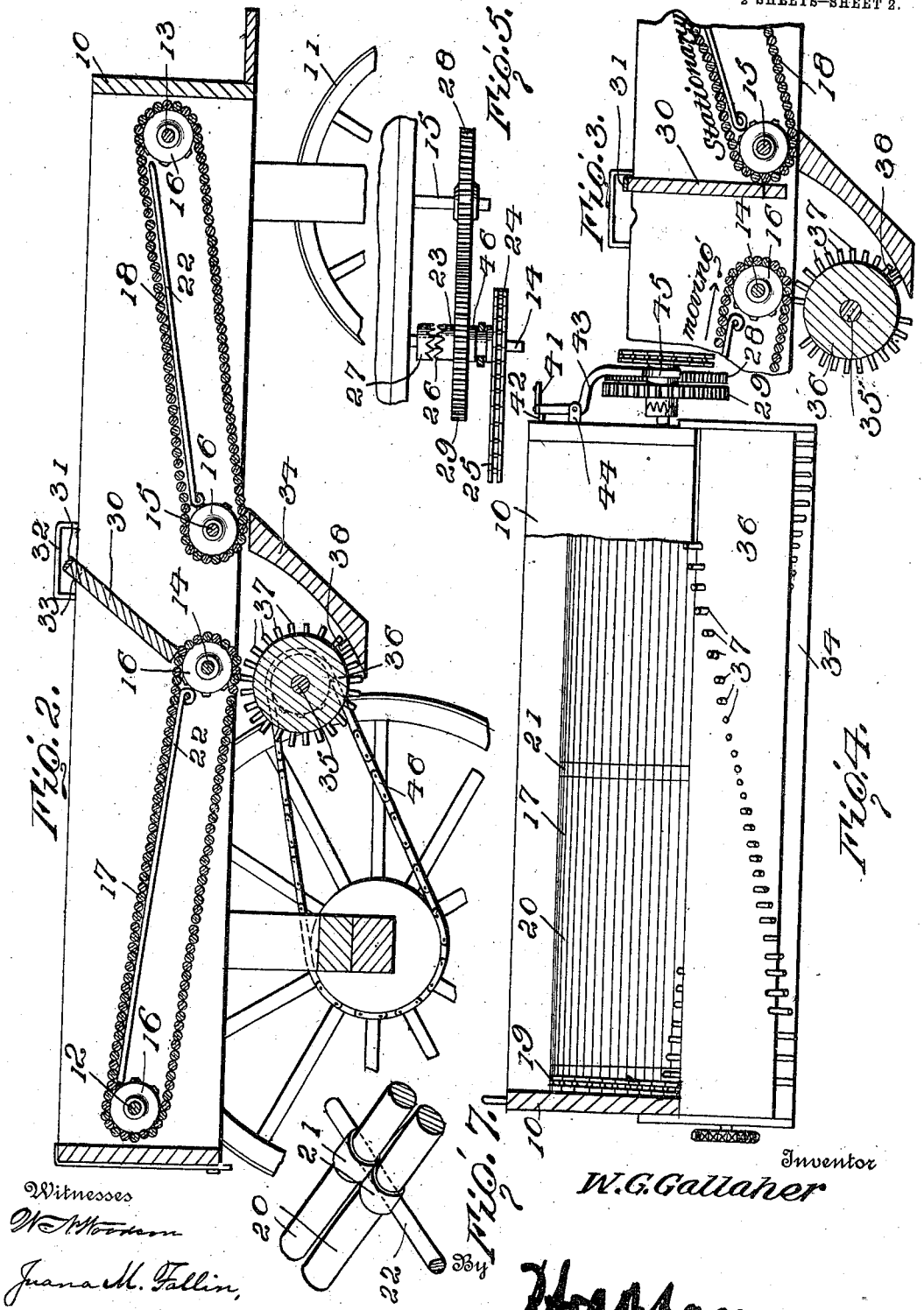

WALLACE G. GALLAHER, OF SHARON SPRINGS, KANSAS.

FERTILIZER-DISTRIBUTER.

989,498.

Specification of Letters Patent. Patented Apr. 11, 1911.

Application filed March 8, 1910. Serial No. 548,041.

*To all whom it may concern:*

Be it known that I, WALLACE G. GALLAHER, citizen of the United States, residing at Sharon Springs, in the county of Wallace and State of Kansas, have invented certain new and useful Improvements in Fertilizer-Distributers, of which the following is a specification.

This invention relates to fertilizer distributers, and has for an object the provision of an improved device of this character for delivering fertilizer from the central portion of the wagon to thereby enable the arrangement of the mechanism in the central portion of the wagon so as to dispose the weight thereof equally at the ends of the device.

The invention has for another object the provision of a suitable partition which is disposed centrally of the body of the distributer and which is automatically actuated to admit of the feeding of the fertilizer first from the forward end of the body and then from the rear end thereof.

The invention further aims to construct a distributer of this nature in which the operative parts thereof are reduced in number and are of simple form so that an economical and practical, as well as an efficient and durable device may be formed.

For a full understanding of the invention reference is to be had to the following description and accompanying drawings, in which:—

Figure 1 is a top plan view of the complete device, part of the same being broken away. Fig. 2 is a longitudinal vertical section through the same. Fig. 3 is a detailed sectional view through the central portion of the distributer disclosing the partition in adjustment to admit of the feeding of the fertilizer from the rear of the body. Fig. 4 is a rear end elevation of the distributer partly in section. Fig. 5 is a top plan view of the belt actuating mechanism detached, and Fig. 6 is a side elevation of the same as applied to the wagon body. Fig. 7 is a fragmentary perspective view, partly in section, of one of the belts.

Corresponding and like parts are referred to in the following description and indicated in all the views of the accompanying drawings by the same reference characters.

Referring to the drawings the numeral 10 designates the body of the distributer which is preferably rectangular and in the form of wagon box, the body 10 being supported in any well-known manner upon the wheels 11. In the opposite ends of the body 10 are arranged transverse shafts 12 and 13 which coöperate with central transverse shafts 14 and 15. The shafts 12 and 13 are located centrally of the opposite ends of the body 10, while the shafts 14 and 15 are arranged adjacent the lower edges of the body 10 and adjacent the central portion of the same. The transverse shafts are provided with spaced sprockets 16 over which are passed endless belts 17 and 18. The endless belts 17 and 18 are thus given a central inclination in order to feed the fertilizer which is positioned on the same downwardly to the central portion of the body 10. It will be observed from Fig. 4 of the drawings that the belts 17 and 18 extend practically the entire width of the body 10 so as to form movable bottoms in the same.

The belts 17 and 18 comprise chains 19 engaging over the sprocket 16, and within the links of which are journaled the opposite ends of rollers 20. The central portions of the rollers are provided with metallic rings 21 which bear upon guides 22 positioned longitudinally within the body 10 and beneath the upper faces of the endless belts 17 and 18. The guides 22 serve the purpose of supporting the rollers 20 in the same plane to form a non-yieldable bottom within the body 10.

The means employed for operating the belts 17 and 18 comprises the lateral extension of the shaft 14 beyond the body 10 and of loosely mounting thereon the sleeve 23. The sleeve 23 is loosely mounted upon the shaft 14 and has free sliding and rotary movement thereabout. The outer end of the sleeve 23 is provided with a sprocket 24 over which passes a chain 25 extending to the drive wheel 11 for actuating the sprocket 24. The inner end of the sleeve 23 is provided with teeth 26 meshing with a toothed collar 27 rigidly secured upon the shaft 14 adjacent the side of the body 10. The central shaft 15 also extends beyond the body 10 in parallel relation with the shaft 14 and supports in rigid relation upon its outer end a gear 28. The gear 28 meshes with a gear 29 carried upon the inner end of the sleeve 23 when the teeth 26 of the sleeve are out of engagement with the toothed collar 27. From this construction it will be observed that when the loose sleeve 23 meshes with the collar 27 the shaft 14 is rotated, and that the gear 29 is out of engagement with the gear 28, the shaft 15 thus being at rest. When the sleeve 23 is shifted outwardly upon the shaft 14 the gear 29 engages the gear 28 and causes the rotation of the shaft 15, while the teeth 26 are out of engagement with the toothed collar 27 to throw the rear belt 17 out of action.

For the purpose of dividing the body 10 into a forward and a rear compartment, a partition 30 is employed. The partition 30 is transversely disposed across the central portion of the body 10 and is provided with a supporting strip 31 upon its upper longitudinal edge, the strip 31 extending beyond the ends of the partition 30 and resting upon the upper edges of the sides of the body 10. Bails 32 are carried upon the sides of the body 10 and extend upwardly from the edges thereof to engage loosely over the projecting ends of the strip 31 to retain the partition 30 is position. The bail 32 is positioned over the inner ends of the conveyers of the endless belts 17 and 18 and admits of the free play of the partition 30 between the inner ends of the belts during the operation of the machine. The upper edges of the sides of the body 10 are notched as at 33 in transverse registered relation to receive the elongated ends of the strip 31 and to frictionally hold the partition 30 against the rear belt 17. In Fig. 2 the partition 30 is disclosed in this position wherein the lower edge of the same rests upon the upper face of the belt 17 at its inner end, and the strip 31 is rested in the notches 33. When the belt 17 is first set in motion the partition 30 will be raised slightly by its forward movement and will consequently lift the strip 31 from the notches 33 and permit of the sliding of the strip 31 longitudinally and forwardly upon the upper edges of the sides of the body 10. The bails 32 are so positioned that the extensions of the strips 31 strike against the forward ends of the same when the lower end of the partition 30 falls upon the conveyer 17.

Referring to Fig. 3 the partition 30 is disclosed as having fallen from the conveyer 17 and wherein the strip 31 is positioned against the forward ends of the bails 32. It will be observed that the partition 30 hangs in a substantially vertical plane and that the lower end thereof strikes against the rear end of the conveyer 18. In this position the forward end of the body 10 is closed, while the rear end thereof communicates with the bottom of the body 10 between the shaft 14 and the partition 30.

Beneath the central portion of the body 10 is transversely positioned a guiding apron or chute 34 in the form of an elongated and flattened body having an upper concaved face. The chute 34 extends downwardly and backwardly from the body 10 from a point immediately beneath the transverse shaft 15 to a point substantially beneath the shaft 14.

Positioned beneath the forward end of the rear conveyer is a distributer shaft 35 upon which is mounted the distributing cylinder 36 having in its periphery a plurality of pins 37 arranged in diagonal alinement endwise of the same. The pins 37 are equidistantly spaced and engage between a plurality of pins 38 arranged in longitudinal alinement across the upper face of the distributer 34, and adjacent the lower end of the same. The pins 37 and 38 are adapted to engage the fertilizer which is fed downwardly upon the apron 34 and pulverize the same.

At the side of the body 10 a hand-lever 39 is mounted which is disposed adjacent the seat of the operator and which carries the forward end of a connecting rod 40 which is pivotally secured to one arm of a bell-crank lever 41 hinged upon a lug 42 extending outwardly from the side of the body 10. The arm of the bell-crank lever 41 to which the connecting rod 40 is secured projects directly outward from the body 10, while the opposite arm of the bell-crank lever 41 projects rearwardly from the lug 42 and is loosely connected to the upper end of the shifting lever 43. The lever 43 is mounted upon ears 44 carried at the side of the body 10, the lever 43 being curved outwardly and downwardly from the ears 44 to engage about the gear 29 and to position the fork-arms 45 within the annular groove 46 formed in the outer end of the sleeve 23 between the gear 29 and the sprocket 24.

The shaft 35 carries upon one end, which extends laterally from the body 10 and preferably in opposite direction from the operating sleeve 23, a sprocket 47 over which is passed a chain 46 operably connected to the adjacent supporting wheel 11.

When the chain 25 is operated the sprocket 24 is revolved to actuate the sleeve 23, and the gear wheel 29. The lever 43 is moved outwardly to carry the sleeve 23 into such position as to intermesh the gears 28 and 29. This adjustment causes the operation of the forward conveyer 18 to feed the fertilizer from the forward end of the body 10 backwardly upon the apron 34. During this operation the partition 30 rests upon the forward end of the conveyer 17 having the ends of the strip 31 engaging in the notches 33 to hold the partition 30 in the inclined position which is disclosed in Fig. 2 in order to close the rear end of the body 10. When the fertilizer has been deposited from the forward end of the body 10 the operator shifts the lever 43 to an inward position, whereupon the sleeve 23 engages the toothed collar 27 and carries the gear 29 out of engagement with the gear 28. The shaft 15 is thus disconnected from the operating sleeve 23 and the shaft 14 set in motion to move the rear conveyer 17 forwardly. The initial movement of the conveyer 17 carries the partition 30 forwardly to a slight distance to raise the ends of the strip 31 out of the notches 33 and to slide the same within the bails 32. The lower end of the partition 30 moves to the extreme forward end of the conveyer 17 when it falls downwardly and hangs upon the strip 31. When the partition 30 swings downwardly the lower end of the same engages against the rear end of the conveyer 18 to close the forward end of the body 10 and to prevent the passage of the fertilizer from the belt 17 over upon the belt 18. The partition 30 also serves the function of deflecting the fertilizer from the belt 17 upon the apron 34. As the machine is moved, the cylinder 36 is rotated through the medium of the chain 46 which is attached to one of the traction wheels 11.

Having thus described the invention what is claimed as new is:—

1. A fertilizer distributer including a 
body, conveyers arranged in the opposite ends of said body, an apron positioned transversely in the central portion of said body between the adjacent ends of said conveyer, a distributing cylinder arranged adjacent said apron, and an adjustable partition carried by said body for coöperation with said conveyers.

2. In a fertilizer distributer the combination with an elongated body, of endless belts arranged in the opposite ends of said body and terminating at their adjacent ends in the central portion of the body, an apron disposed between the belts at the central portion of said body, a distributer therefor arranged in coöperative relation with said apron, and an adjustable partition carried by said body to coöperate with said belts.

3. A fertilizer distributer including an elongated body portion, means disposed in said body portion for feeding the fertilizer to the central portion thereof, and a partition arranged in said body portion to alternately close the front and rear portions of said body.

4. A fertilizer distributer including a body, independent endless belts in said body, a partition adjustably disposed in the central portion of said body to divide the body into compartments, and a distributer arranged beneath the inner adjacent ends of said belts.

5. In a fertilizer distributer the combination with an elongated body, endless belts arranged longitudinally in the opposite ends of said body, a partition adjustably disposed at the central portion of said body to form front and rear compartments therein, means for independently actuating said belts, and a distributer arranged centrally in said body between the ends of said belts.

6. A fertilizer distributer including an elongated body, endless belts longitudinally arranged in said body, a partition disposed in said body to coöperate with said belts to form front and rear compartments, and a distributer located centrally in said body between said belts.

7. A fertilizer distributer including an elongated body, belts arranged in the opposite ends of said body to form separate bottoms therein, a partition adjustably disposed in said body to coöperate with said belts to form compartments in the body, and a distributer located beneath said partition to alternately receive fertilizer from said belts.

8. A fertilizer distributer including an elongated body, endless belts arranged longitudinally in the opposite ends of said body for alternate operation, a partition mounted in said body for alternate coöperation with the belts to form compartments in the body, and means disposed beneath the adjacent ends of said belts to distribute fertilizer therefrom.

9. A fertilizer distributer including an elongated body, a conveyer mounted in the forward end of said body and inclined toward the central portion thereof, an apron located beneath the rear end of said conveyer, a second conveyer arranged at the rear end of said body and inclined forwardly and centrally within the same, a partition loosely supported upon the upper edge of said body at its central portion and resting at its lower edge upon the forward end of said second conveyer, studs oppositely extending from the upper end of said partition to support the same, and bails disposed in registered relation upon the opposite sides of said body to limit the movement of said studs.

10. A fertilizer distributer including an elongated body portion, a partition centrally disposed in said body portion to form front and rear compartments, endless belts disposed in the outer ends of the compartments, means connected to said belts for alternately actuating the same, and a distributer disposed centrally beneath said body portion to alternately receive the fertilizer from said belts.

11. A fertilizer distributer including a body, endless bottoms located in the forward and rear ends of said body, a distributer disposed centrally beneath said body to receive material from said bottoms, a partition adjustably disposed in said body to divide the same into front and rear compartments, and means for automatically actuating said partition to alternately place the compartments in communication with said distributer.

12. A fertilizer distributer including a body, feeders arranged in the opposite ends of the body, a partition loosely arranged in the body between the feeders and adapted to be actuated by the feeders, and a distributer carried by the body beneath the partition to alternately receive fertilizer from the feeders.

In testimony whereof I affix my signature in presence of two witnesses.

WALLACE G. GALLAHER. [L. S.]

Witnesses:
 NOLA HAIL,
 E. J. ERICKSON.